(12) United States Patent
Schwartz

(10) Patent No.: US 6,910,185 B1
(45) Date of Patent: Jun. 21, 2005

(54) BI-DIRECTIONAL TEXT SUPPORT IN LEGACY APPLICATIONS

(75) Inventor: Bruce V. Schwartz, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/558,476

(22) Filed: Apr. 25, 2000

(51) Int. Cl.[7] .............................................. G06F 17/21
(52) U.S. Cl. ..................... 715/536; 715/530; 715/531
(58) Field of Search ................................ 715/536, 531, 715/538

(56) References Cited

U.S. PATENT DOCUMENTS

| | | | |
|---|---|---|---|
| 5,784,069 A | * | 7/1998 | Daniels et al. ............... 345/467 |
| 5,812,122 A | * | 9/1998 | Ng ............................ 345/703 |
| 5,857,201 A | * | 1/1999 | Wright et al. ............ 707/104.1 |
| 6,493,735 B1 | * | 12/2002 | Kumhyr ..................... 715/536 |

FOREIGN PATENT DOCUMENTS

EP        0585073 A2    3/1994

OTHER PUBLICATIONS

"The UCData Unicode Character Properties and Bidi Algorithm Package", [http://web.archive.org/web/20000418023934/http://crl.nmsu.edu/~mleisher/ucdata.html], published on the Internet on Apr. 18, 2000.*

David J. Ittner, "Automatic Inference of Textline Orientation", 12508 Proceedings, Second Annual Symposium on Document Analysis & Information Retrieval, pp. 123–133, 1993, XP 000522437.

* cited by examiner

Primary Examiner—Joseph Feild
Assistant Examiner—Peter J. Smith
(74) Attorney, Agent, or Firm—Blakely, Sokoloff, Taylor & Zafman LLP

(57) ABSTRACT

A method and apparatus for support of bi-directional text in legacy applications is disclosed. The method may be used in different embodiments for either monospace or proportionally spaced fonts. In general, the method involves first flipping all of the text, and thereby putting most of the text into its proper position and orientation. The method then involves finding any foreign (left-to-right) text within the flipped text, and flipping it back.

28 Claims, 12 Drawing Sheets

PLEASE CHECK OUR
WEB SITE FOR UP
DATES

Figure 1A

PLEASE CHECK OUR
WEB SITE FOR UP
DATES

Figure 1B

PLEASE CHECK WITH
joe clemens FOR
UPDATES.

Figure 2A

PLEASE CHECK WITH
joe clemens FOR
UPDATES.

Figure 2B

PLEASE CHECK joe
clemens FOR
UPDATES.

Figure 3A joe PLEASE CHECK
FOR    clemens
UPDATES.

Figure 3B

| H₁ | H₂ | H₃ | H₄ |    | H₅  | H₆  | H₇  |    |
|----|----|----|----|----|-----|-----|-----|----|
| H₈ | H₉ | H₁₀| H₁₁| H₁₂|     | F₁  | F₂  | F₃ |
| F₄ | F₅ | F₆ |    | H₁₃| H₁₄ | H₁₅ |     |    |

Figure 4A

|    | H₇ | H₆ | H₅ |    | H₄  | H₃  | H₂ | H₁ |
|----|----|----|----|----|-----|-----|----|----|
| F₃ | F₂ | F₁ |    | H₁₂| H₁₁ | H₁₀| H₉ | H₈ |
|    |    | H₁₅| H₁₄| H₁₃|     | F₆  | F₅ | F₄ |

Figure 4B

|    | H₇ | H₆ | H₅ |    | H₄  | H₃  | H₂ | H₁ |
|----|----|----|----|----|-----|-----|----|----|
| F₁ | F₂ | F₃ |    | H₁₂| H₁₁ | H₁₀| H₉ | H₈ |
|    |    | H₁₅| H₁₄| H₁₃|     | F₄  | F₅ | F₆ |

Figure 4C

BI-DIRECTIONAL TEXT SUPPORT IN LEGACY APPLICATIONS

BACKGROUND OF THE INVENTION

1. Field of the Invention

The invention relates to user interfaces and more particularly relates to display of text from legacy applications written for unidirectional text in bi-directional text environments.

2. Description of the Related Art

Handling bi-directional text presents challenges to designers of user interfaces. In one example, the bi-directional text may include both native text which is read right-to-left and foreign text which is read left-to-right. Thus, the bi-directional text cannot be simply printed or displayed one character after another. Unidirectional text, in contrast, is text which is all left-to-right (or right-to-left) text. With bi-directional text, native text, such as Hebrew or Arabic, should be displayed in a right-to-left order, while the foreign text, such as English, should be displayed in a left-to-right order. An example would be an article reported in Arabic or Hebrew that contains quotes or terms of art in English that are not translated. In such an article, the main text of the article, the Arabic or Hebrew text, is read right-to-left, but the untranslated English portions are read left-to-right. While this is conceptually simple for the reader, laying out this text may prove difficult.

In particular, if the text is stored in the order in which it is to be displayed or printed, then manipulation of the text may prove complex because of the embedded portions of the text which are oriented backwards relative to the rest of the text. Moreover, on mobile computing devices, bi-directional text may be important when the device is in an area where such text is utilized, but unidirectional text may be important when the device is in an area where text only flows in one direction.

Typically, software is written to either handle right-to-left or left-to-right style text, not both. Moreover, most software is developed in locations where people read left-to-right, so compatibility for right-to-left or bi-directional text is not considered. Typically, text is stored as a string of characters in memory as the characters would be printed in a left-to-right fashion. Thus, it is potentially valuable to create software which may be used to adapt software written solely for left-to-right text for use in a bi-directional text environment. A bi-directional text environment may be defined as either an area where bi-directional text is utilized, or a device in which support for bi-directional text is part of the functionality of the device or its software.

SUMMARY OF THE INVENTION

A method and apparatus for support of bi-directional text in legacy applications is disclosed. The method may be used in different embodiments for either monospace or proportionally spaced fonts. In general, the method involves first flipping all of the text, and thereby putting most of the text into its proper position and orientation. The method then involves finding any foreign (left-to-right) text within the flipped text, and flipping it back.

BRIEF DESCRIPTION OF THE DRAWINGS

The present invention is illustrated by way of example and not limitation in the accompanying figures.

FIG. 1A illustrates unadjusted bi-directional text.

FIG. 1B illustrates adjusted bi-directional text.

FIG. 2A illustrates unadjusted bi-directional text.

FIG. 2B illustrates adjusted bi-directional text.

FIG. 3A illustrates unadjusted bi-directional text.

FIG. 3B illustrates adjusted bi-directional text.

FIG. 4A illustrates unadjusted bi-directional text.

FIG. 4B illustrates partially adjusted bi-directional text.

FIG. 4C illustrates adjusted bi-directional text.

DETAILED DESCRIPTION

Figure 4D:
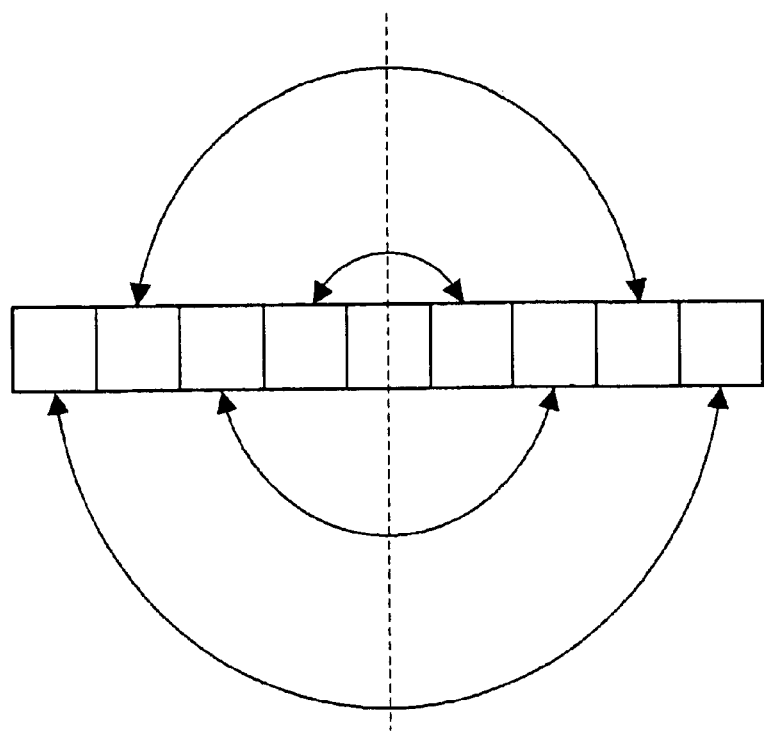
FIG. 4D illustrates flipping of characters within a line of text.

A method and apparatus for bi-directional text support in legacy applications is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

The method, in one embodiment, may be used in different embodiments to support display or printing of bi-directional text for either monospace or proportionally spaced fonts. Monospace fonts are fonts in which all letters (or all characters) are of the same width, and are generally found on simple displays. Proportionally spaced fonts are fonts having different widths for each letter in the font. In general, the method involves first flipping all of the text of a line of text about the center vertical axis of the line (including any leading or trailing blank space), and thereby putting most of the text into its proper position and orientation. The method then involves finding any foreign (left-to-right) text within the flipped text, and flipping it back about the center of the foreign text within the area where the foreign text is located, thus putting that text into its proper orientation. As a result, the text is in a condition such that it may be displayed in the order and format in which it is stored.

The method, in one embodiment, may be particularly suitable for mobile computing devices of various complexity. Such devices typically have small screens for which the storage (memory) for the entire display is not large. As a result, the brute-force approach of flipping all text and then flipping back foreign text may not be computationally expensive. Moreover, the lack of need for data structures for holding text to be flipped can further improve performance in such devices.

FIGS. 1A, 1B, 2A, 2B, 3A and 3B all illustrate a before-and-after perspective of text, before and after the method is performed on the text. Each figure depicts three lines of text on a small display. In each figure, capitalized letters represent text which should be read (and therefore displayed) right-to-left. Lowercase letters represent text which should be read and displayed left-to-right. Thus, in FIG. 1A, all of the text ("PLEASE CHECK OUR WEB SITE FOR UP DATES") is capitalized (representing text in a language such as Hebrew or Arabic for example) and should therefore be displayed right-to-left. In FIG. 1B, the text of FIG. 1A is illustrated in right-to-left orientation (after the method is performed).

Similarly, most of the text ("PLEASE CHECK WITH" and "FOR UPDATES.") in FIG. 2A is capitalized (right-to-left), with the exception of the text 'joe clemens' which is lowercase (left-to-right). FIG. 2B illustrates the resulting display of the text after the method is performed. Likewise, all of the text ("PLEASE CHECK" and "FOR UPDATES.") of FIG. 3A is right-to-left, except for the two portions, 'joe' and 'clemens' which are left-to-right. The resulting display of the text after the method is performed is illustrated in FIG. 3B. In each of these figures, one of the three general cases of bi-directional text is illustrated. In FIGS. 1A and 1B, no foreign text is present. In FIGS. 2A and 2B, foreign text is present on one line. In FIGS. 3A and 3B, foreign text is present on multiple lines. Note that the punctuation follows the characters it is associated with.

The two portions 'joe' and 'clemens' may be referred to as runs. A run is a group of characters which are adjacent to each other for purposes of display and which share a common set of characteristics. For purposes of this discussion, runs do not span lines. In general, a run may be defined as a set of characters which share the same font, the same style, the same type-size, or other characteristics. However, for this discussion, we will refer to runs of characters which are either all right-to-left characters or all left-to-right characters.

Turning to FIGS. 4A, 4B and 4C, the transformations the text undergoes for monospace fonts are illustrated. For each of these figures, characters with an H represent characters in Hebrew or Arabic, which should be displayed right-to-left. Characters with an F represent foreign (non-Hebrew or non-Arabic as appropriate) characters, which should be displayed left-to-right. The text as illustrated in FIG. 4A is in the form in which it would be stored in memory, in the order in which it would be displayed or printed in left-to-right fashion. In FIG. 4B, the text is illustrated after it has been broken down into lines and reversed or flipped about the center vertical axis of the line within each line. Note that no change has been made to the orientation of each individual character, rather the relative locations of the various characters have been rearranged. In FIG. 4C, the characters within the runs of foreign characters have been flipped again within the run (flipped about the vertical center axis of the run), thus resulting in a display which has right-to-left characters and left-to-right characters (a bi-directional display) properly positioned.

Figure 4E:
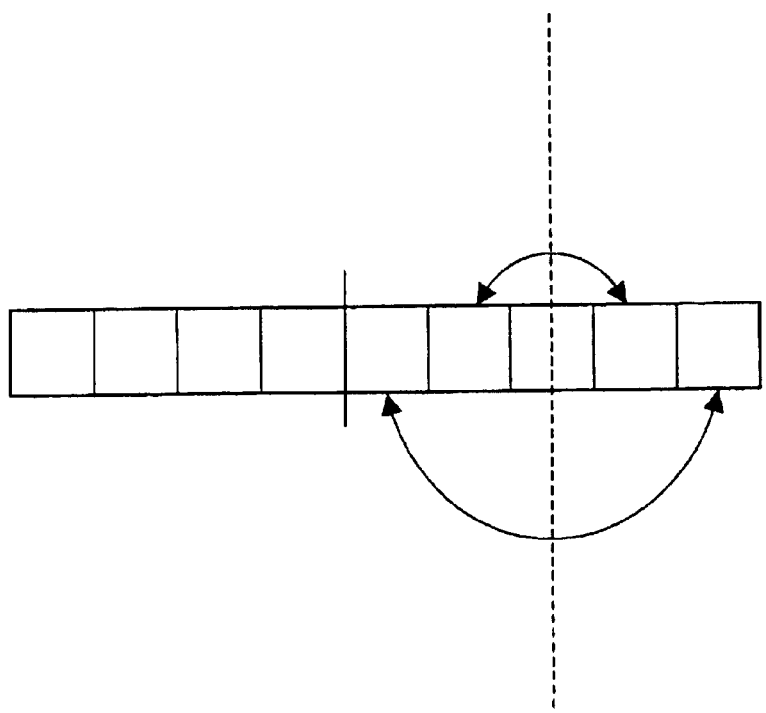
FIG. 4E illustrates flipping of characters within a run of text.

FIG. 4D illustrates flipping characters about a vertical center axis of a line. Similarly, FIG. 4E illustrates flipping characters about a vertical center axis of a run. In each case, the characters are flipped or exchanged between positions on opposite ends of the ordered group of characters which are to be flipped. Note that for odd numbers of characters, such as the line for FIG. 4D and the run of FIG. 4E, the center character does not move, it is not exchanged.

Figure 5A:
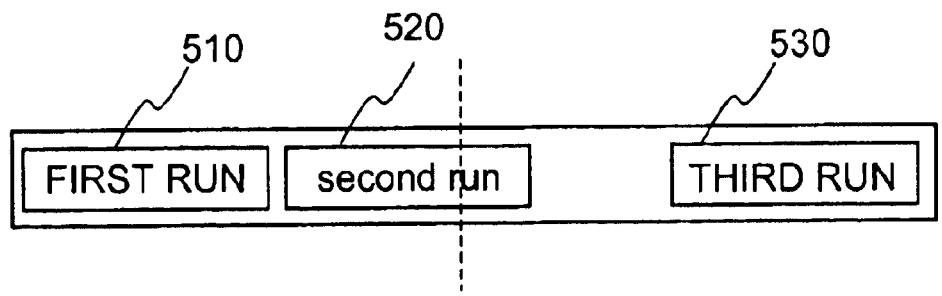
FIG. 5A illustrates unadjusted bi-directional text in a proportional font.
Figure 5B:
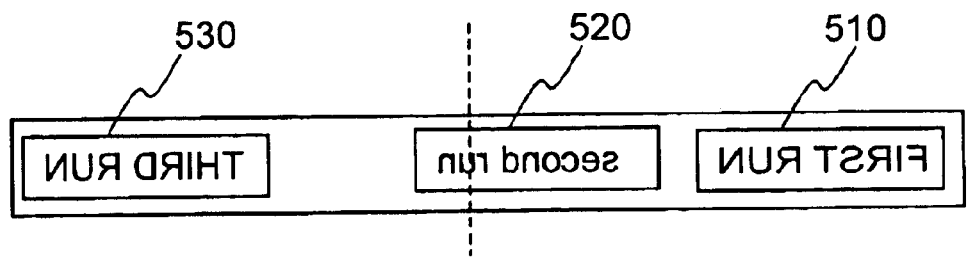
FIG. 5B illustrates partially adjusted bi-directional text in a proportional font.
Figure 5C:
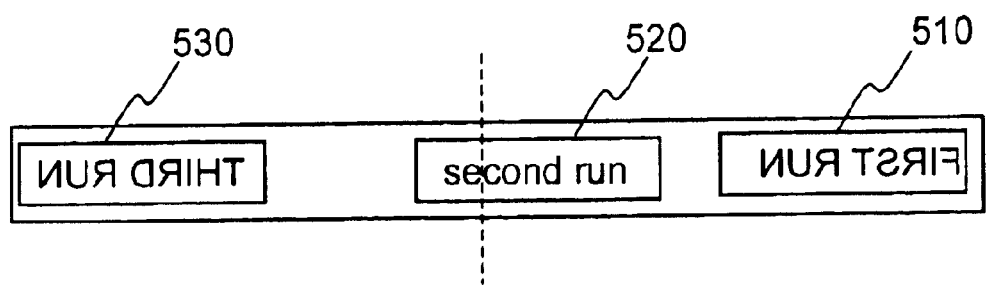
FIG. 5C illustrates adjusted bi-directional text in a proportional font.

Turning to FIGS. 5A, 5B and 5C, the transformations the text undergoes for proportional spaced fonts are illustrated. In each figure, three runs of text are illustrated, along with the vertical center axis of the display in which the three runs appear. Runs 510 and 530 contain text which should be displayed right-to-left. Run 520 contains text which should be displayed left-to-right. Each of the three runs 510, 520 and 530 have a first end which is marked by shading and indicates the start of the text in that run. In FIG. 5A, all three runs are displayed as they are stored in memory. Note that each run is a box of text with a position, as characters in proportional spaced fonts may not simply be specified by which character location on the screen should be occupied.

Turning to FIG. 5B, each of the three runs is flipped in its position about the vertical center axis of the display. Note that this not only means that the run moves from one side of the screen to the other, but that it is also flipped from a left-to-right to a right-to-left orientation. As mentioned previously, run 520 is meant to be displayed in left-to-right fashion. FIG. 5C illustrates the final display of the text. Run 520 has been flipped again, but this time the flip is performed about the axis along the center of run 520, so that it stays in place relative to the other runs (510 and 530).

Figure 6:
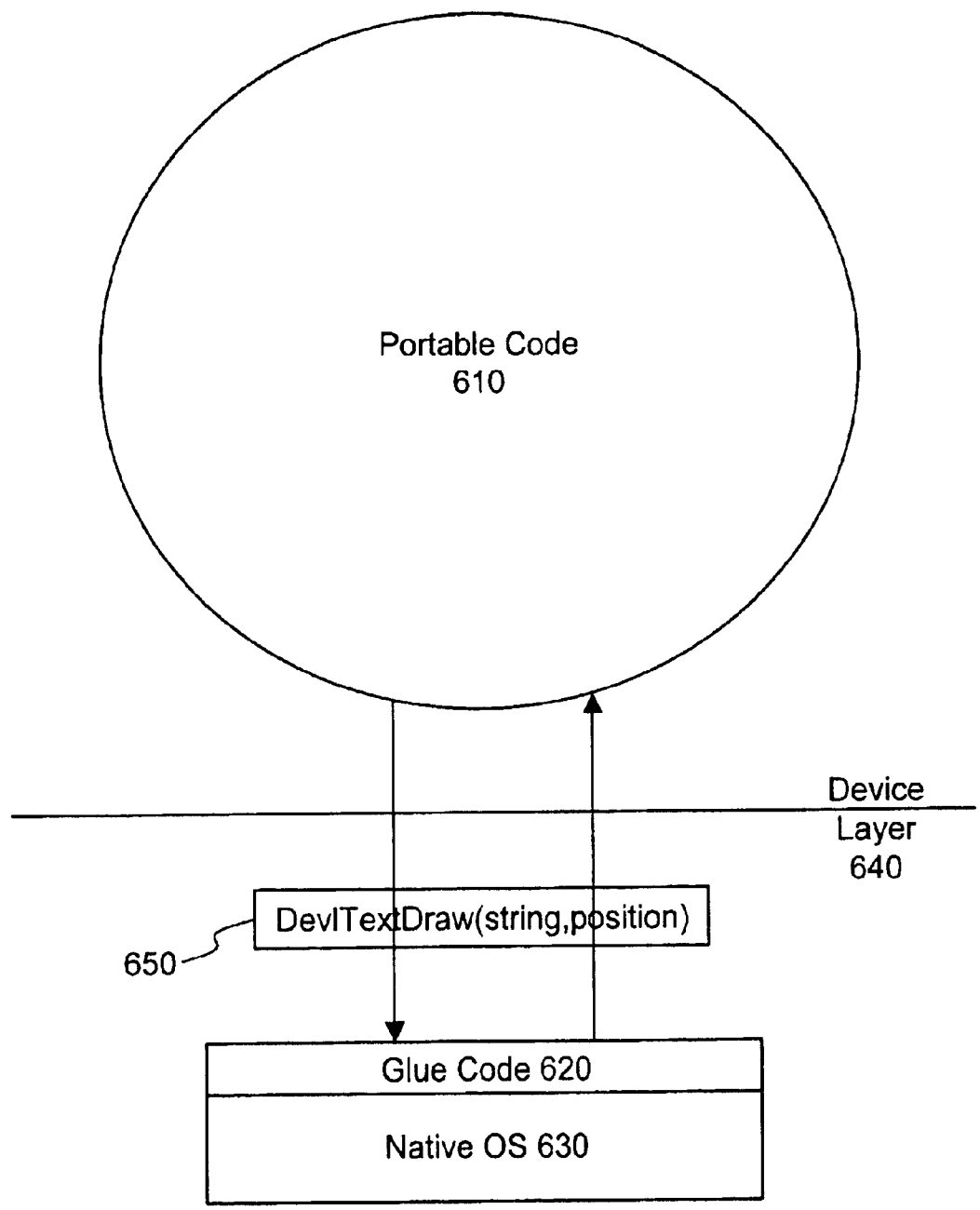
FIG. 6 illustrates an embodiment of a system.

Turning now to FIG. 6, an embodiment of a system which may support bi-directional text in legacy applications is illustrated. Many applications are written in portable code 610, which may be used on multiple devices without modification. The portable code 610 contains references to device-specific code, with the expectation that those references will be useful to accomplish well-defined tasks on the devices on which the portable code 610 is executed. Each device may be expected to have a native operating system (OS) 630, and it may also have glue code 620, i.e. code which may form the interface between the portable code 610 and the native OS 630. Note that glue code 620 may be included with portable code 610 in some products, it may be standard glue code which is expected to be present on some devices, or it may be some combination of the two. Typically, the division between the portable code 610 on one side and the glue code 620 and native OS 630 on the other side may be represented as the device layer 640.

To implement the support of bi-directional text in legacy applications, additional code may be added, in the form of layer 650. Layer 650, represented in one embodiment as a routine 'DevlTextDraw' with parameters of a string and a position, may be used to perform the flipping and selective flipping discussed previously. It will be appreciated that the exact location of the layer 650 may not be apparent, as it may form part of the glue code 620 or it may be written in a more device-independent form such that it would appear to belong on the portable side of the device layer 640.

However, it will similarly be understood that layer 650 accepts a request to draw text which the portable code is written to draw in left-to-right fashion. Layer 650 then transforms the text accompanying the request such that it can then be sent to the glue code 620 or native OS 630 in a format such that the native OS 630 and glue code 620 can process the text as though the text came from an application that has bi-directional text capabilities. In so doing, the code, hardware, or whatever else may embody the method of flipping and flipping selectively provide support in a bi-directional text environment for a legacy application suitable for unidirectional text.

It will be further appreciated that a layer such as layer 650 may be useful in devices such as cellphones, handheld computers or appliances, pagers, and other devices which have limited memory and processor resources. As such, layer 650 may function better in its environment if it does not use a lot of memory and if it utilizes a simple and straightforward process. So, it may be preferable to avoid the use of complicated data structures. Additionally, it may be expected that the size of the display will be small enough that techniques which would be viewed as brute-force and computationally expensive may be well suited to embodiment in layer 650.

Figure 7:
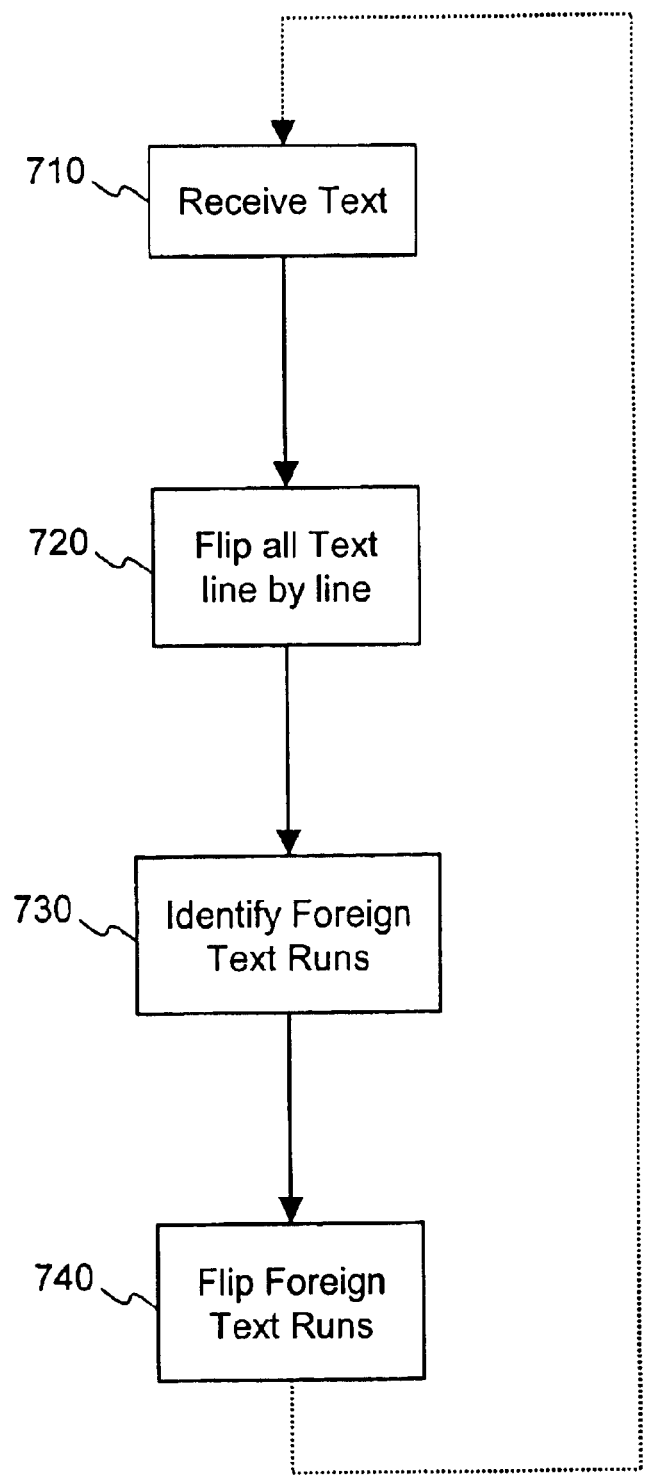
FIG. 7 illustrates an embodiment of a method of adjusting text in a monospace font.

Turning to FIG. 7, one embodiment of a method of formatting text from a legacy application for bi-directional text display in a monospace font is illustrated. At block 710, the text to be displayed is received. This text may be received as part of a line with a location at which it is to be displayed, a full line, or a set of characters that span multiple lines. To the extent that the text received at block 710 spans multiple lines, it is broken into separate lines for processing.

At block 720, all of the text that was received is flipped on a line-by-line basis. In one embodiment, this is done by exchanging the contents of character locations which are directly opposite each other relative to the vertical center axis of the display on which the characters will appear.

After each line has been flipped, at block 730, all runs of foreign characters are identified. These runs may include spaces or punctuation, but will not be identified as spanning lines. Then, at block 740, each of the runs of foreign characters is flipped in place, such that those runs have their original left-to-right orientation. At this point, the text may be passed on to be displayed, as all of the characters are now in the proper position for display. As will be appreciated, this process may be repeated as much as necessary for each succeeding set of text which is to be displayed.

Figure 8:
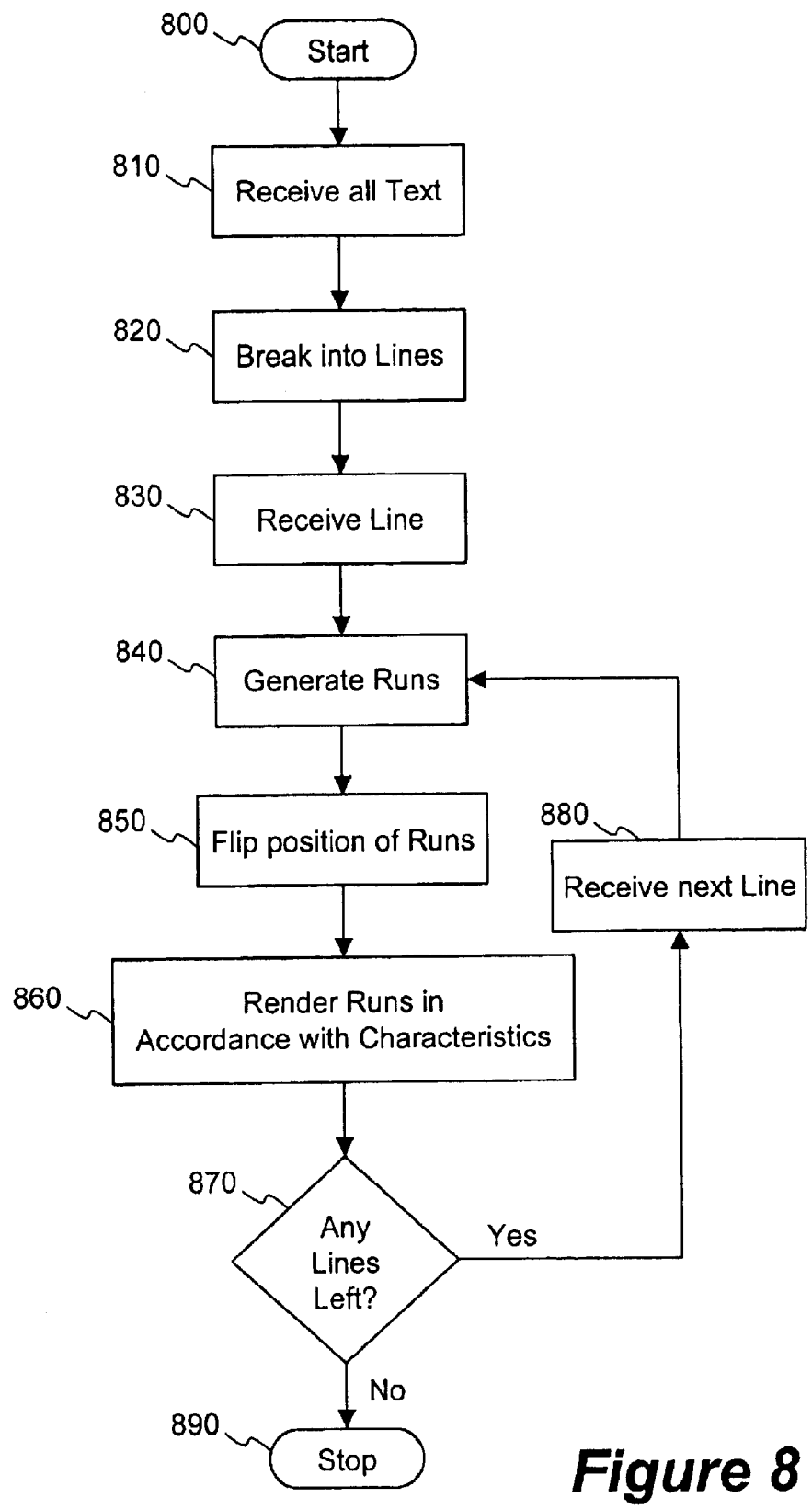
FIG. 8 illustrates an embodiment of a method of adjusting text in a proportional font.

Turning to FIG. 8, one embodiment of a method of formatting text from a legacy application for bi-directional text display in a proportionally spaced font is illustrated. At block 800, the process begins. At block 810, all text to be displayed is received. This may include both a string of characters and a start position for display in one embodiment, and may further include style information such as point size or which font to use.

At block 820, the text is broken into lines. In the process, the possibility of a run of foreign (left-to-right) text spanning two lines is eliminated. This means that a string of foreign text which spans two lines will be broken into two strings, one on each line, which will be processed separately. At block 830, the first line of text is received for further processing. At block 840, the runs of left-to-right and right-to-left text are identified or generated.

At block 850, the positions of the runs are flipped about the vertical axis of the screen, as was discussed with respect to FIGS. 5A, 5B and 5C. Thus, each run is identified as a string of characters and a location, and then the locations are flipped about the axis, with the orientation flipped as well.

Next, at block 860, the runs are then rendered in accordance with their right-to-left or left-to-right characteristics. Thus, the runs with left-to-right characteristics are effectively flipped back to their original orientation for rendering purposes.

At block 870, a determination is made as to whether any more lines of text need to be processed. If more lines remain, the next line is effectively received for no processing at block 880, and the process then moves to block 840 for generation of runs within that line. If no more lines remain, the process terminates at block 890.

Figure 9:
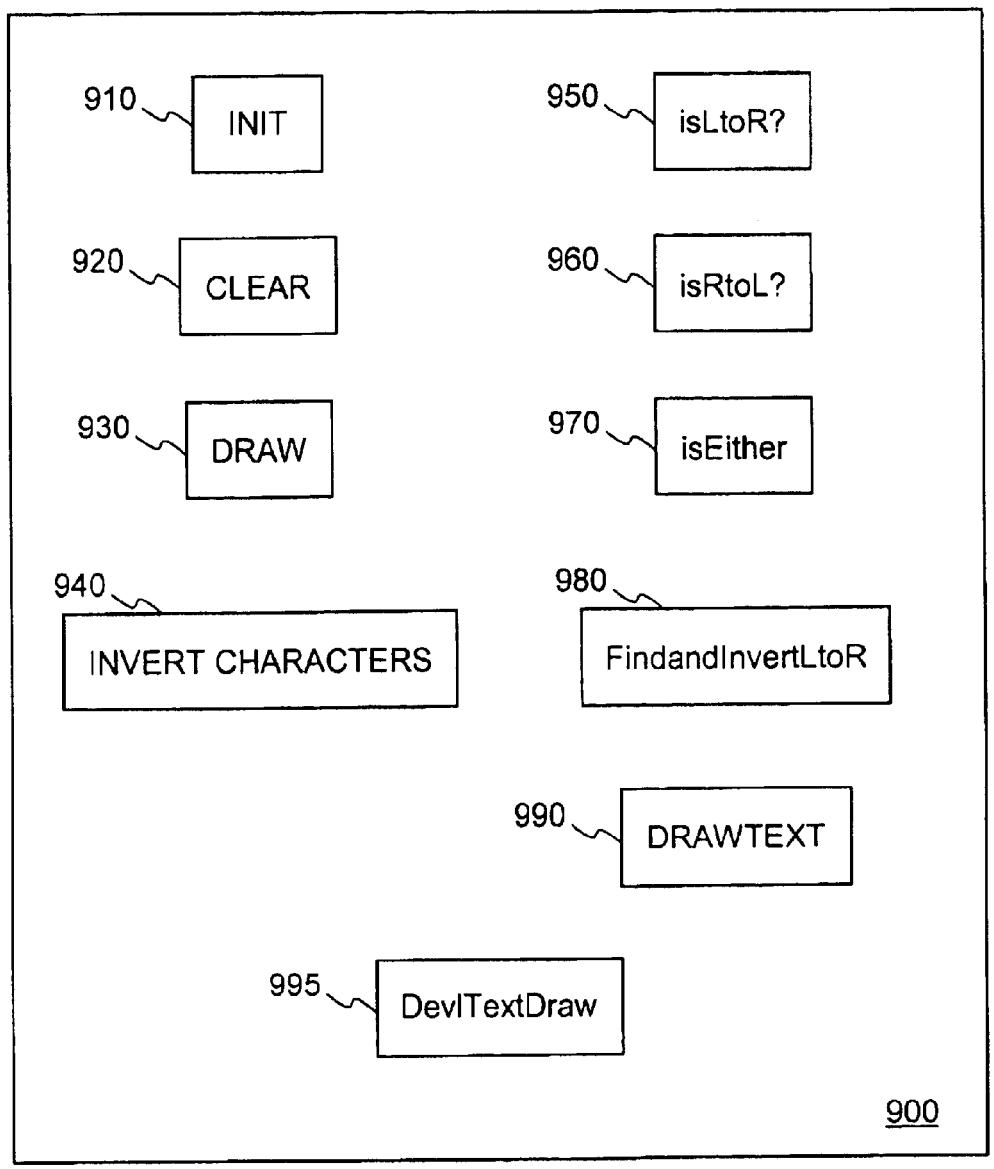
FIG. 9 illustrates an exemplary medium embodying a method of adjusting text.

Turning to FIG. 9, a machine-readable medium embodying a method of supporting bi-directional text is illustrated. Note that the method may be embodied in a medium in the form of instructions that a processor may execute. Execution of the instructions may be expected to cause the processor to perform the method of supporting bi-directional text. The medium may be magnetic media such as tape or disk, optical media, electronic media such as random access or read-only memory (including EPROM and EEPROM), a carrier wave, or any other machine-readable medium. Similarly, the method may be embodied in instructions, the instructions may be downloaded or transmitted from a server to a client, and those instructions may be executed by the processor of the client to cause the processor to perform the method. Such a client may be a remote client coupled to the server through a wireline or wireless link, such as a wireless device for example.

In the embodiment illustrated, medium 900 includes multiple modules. Init 910 is an initialization routine which may prepare a buffer or otherwise prepare a display. Clear 920 is a routine which may be used to clear the display. Draw 930 is a routine which may be used to actually draw a character on the display. IsLtoR 950 is a routine which indicates whether a character should be displayed in a left-to-right fashion. Similarly, isRtoL 960 is a routine which indicates whether a character should be displayed in a right-to-left fashion and isEither 970 is a routine which indicates whether a character may be displayed as either left-to-right or right-to-left. Characters which may be displayed in either fashion are typically blank spaces or punctuation, but other characters may be included as appropriate.

InvertCharacters 940 is a routine which inverts all of the characters within a line without respect to whether the characters should be displayed in a right-to-left or left-to-right fashion. FindandInvertLtoR 980 is a routine which finds runs of characters in a line which should be displayed in left-to-right fashion and inverts the characters within the run. Thus, using InvertCharacters 940 in concert with FindandInvertLtoR 980 may result in the transformations previously outlined. Drawtext 990 is a routine which may be used to automate the calls or interfaces to the other routines. Finally, DevlTextDraw 995 is a routine which may have a device independent interface to legacy applications and may in turn call Drawtext 990.

Figure 10:
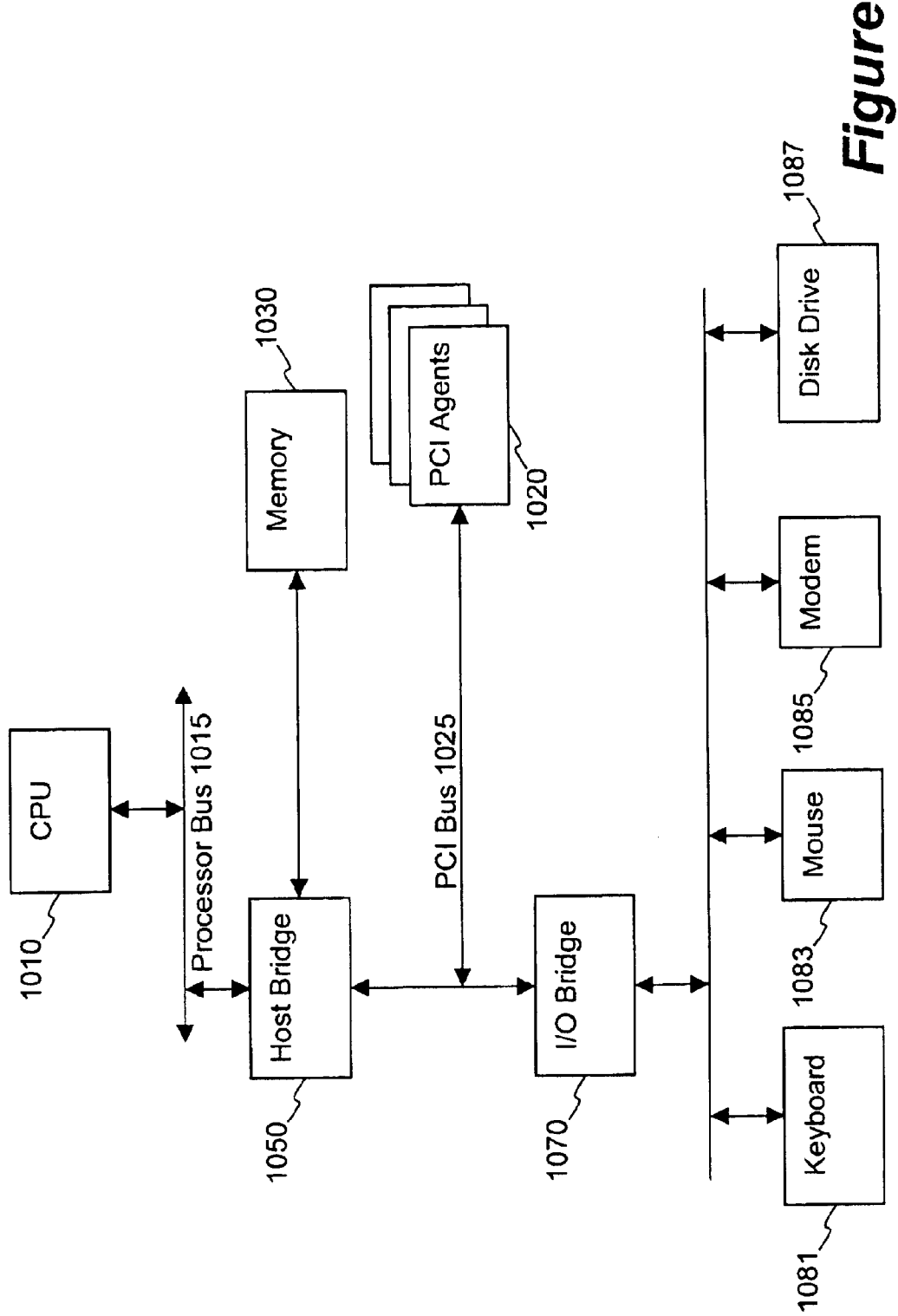
FIG. 10 illustrates an embodiment of a general purpose computer.

Turning to FIG. 10, an embodiment of a conventional general purpose computer is illustrated. CPU 1010 is coupled to processor bus 1015, which in turn is coupled to host bridge 1050. Host bridge 1050 is coupled to memory 1030 and to both I/O bridge 1070 and PCI bus 1025. PCI Bus 1025 is coupled to PCI Agents 1020. I/O bridge 1070 is coupled to keyboard 1081, mouse 1083, modem 1085 and disk drive 1087. The apparatus and function of the embodiment of FIG. 10 will be well understood by those skilled in the art.

Figure 11:
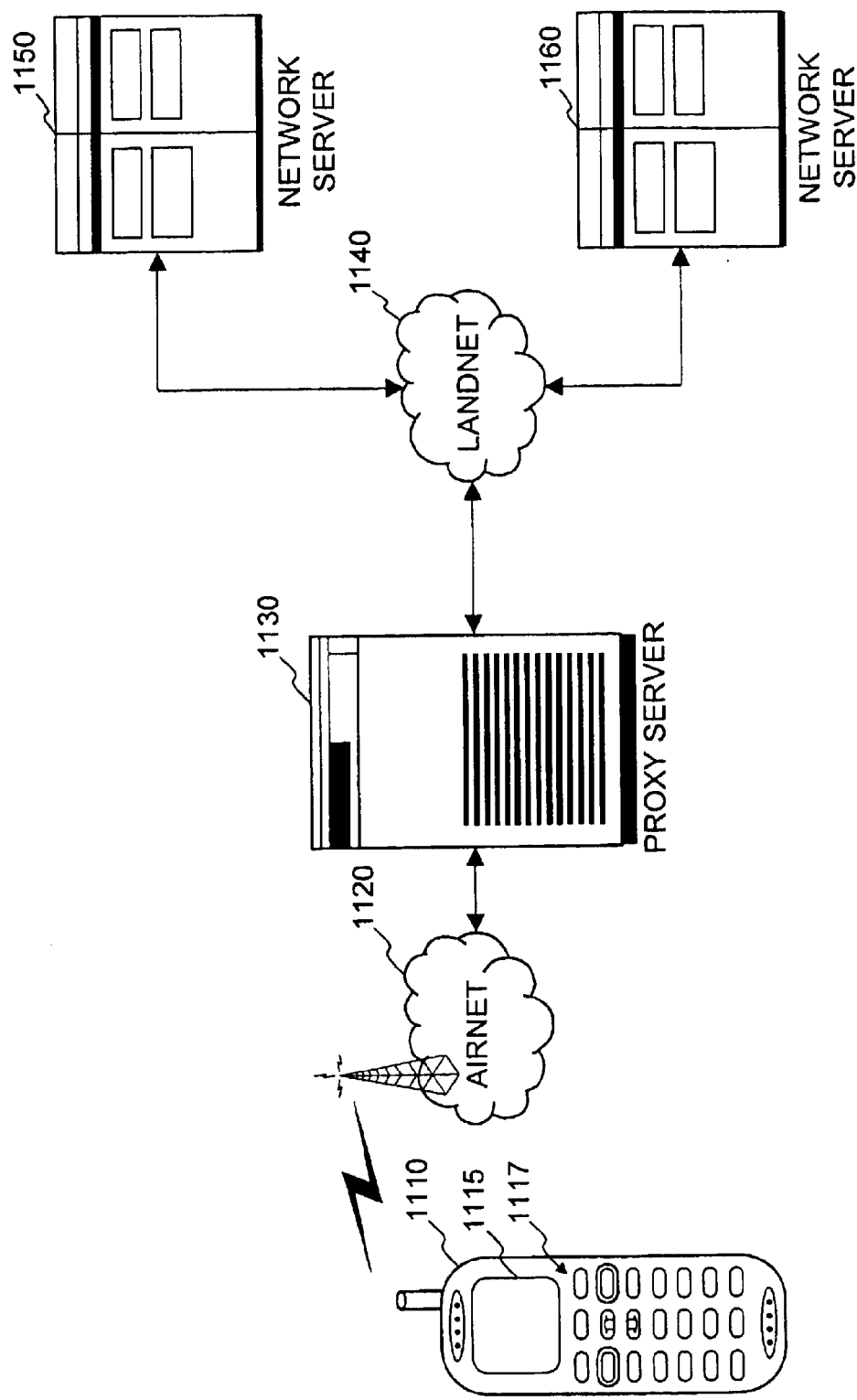
FIG. 11 illustrates an embodiment of a network including servers as connected to a wireless device.

Turning to FIG. 11, an embodiment of a network in which a wireless device may be used is illustrated. Mobile device 1110 may retrieve hypermedia information (such as HTML documents, Compact HTML (cHTML) documents, Extensible Markup Language (XML) documents, HDML documents, or WML documents for example) from one or more network server devices. Network server devices 1150 and 1160 represent the myriad network server devices which may be accessible through either public or private networks, such as the Internet, or a corporate LAN. Network servers 1150 and 1160 may, for example, be general purpose computers or other devices capable of communicating over a network and having accessible information suitable for transmission over a network.

Mobile device 1110 has a display 1115 and a user interface 1117. Additionally, in one embodiment, mobile device 1110 may include a microbrowser, such as the UP.Browser microbrowser offered by Phone.com of Redwood City, Calif. Such a microbrowser may be stored in a local memory of the mobile device 1110, which enables the mobile device 1110 to access and retrieve hypermedia information from network servers such as network servers 1150 and 1160.

The communication path between mobile device 1110 and network servers 1150 and 1160, in the embodiment illustrated, includes aimet 1120, proxy server device 1130, and landnet 1140. It will be appreciated that other communications paths may be utilized. Aimet 1120 is a wireless communications network, such as a cellular digital packet data network (CDPD), a Global System for Mobile (GSM) network, a Code Division Multiple Access (CDMA) network, or a Time Division Multiple Access (TDMA) network for example. The communications protocols used by aimet 1120 may include, for example, WAP and/or HDTP. Aimet 1120, in one embodiment, may be utilized to transmit and receive voice or other data to and from wireless device 1110, along with hypermedia data.

Proxy server device 1130 may be, for example, a conventional general purpose computer, such as a workstation or PC. Proxy server device 1130 acts as a bridge between aimet 1120 and landnet 1140. It will be appreciated that the same equipment may be suitable for the roles of both the proxy server device 1130 and network servers 1150 and 1160. In one embodiment, proxy server device 1130 transforms data received via landnet 1140 into a form suitable for transmission over aimet 1120, and similarly transforms data received via aimet 1120 into a form suitable for transmission over landnet 1140.

Landnet 1140, in one embodiment, is a primarily land-based network that may include the Internet or World Wide Web. Landnet 1140 may also include an intranet, a local area network, or other suitable collection of connected machines. Communication via landnet 1140 may be expected to utilize a protocol such as Transmission Control Protocol (TCP/IP), HTTP, or Secure HTTP (sHTTP).

It will be appreciated that in an alternate embodiment, a browser or other software may be hosted on a machine such as proxy server 1130 and used to control the display 1115 of mobile device 1110. Whether the display 1115 is controlled within the mobile device 1110 or at a remote location, the method and apparatus for supporting bi-directional text may be used to support display of bi-directional text on the mobile device 1110.

Figure 12:
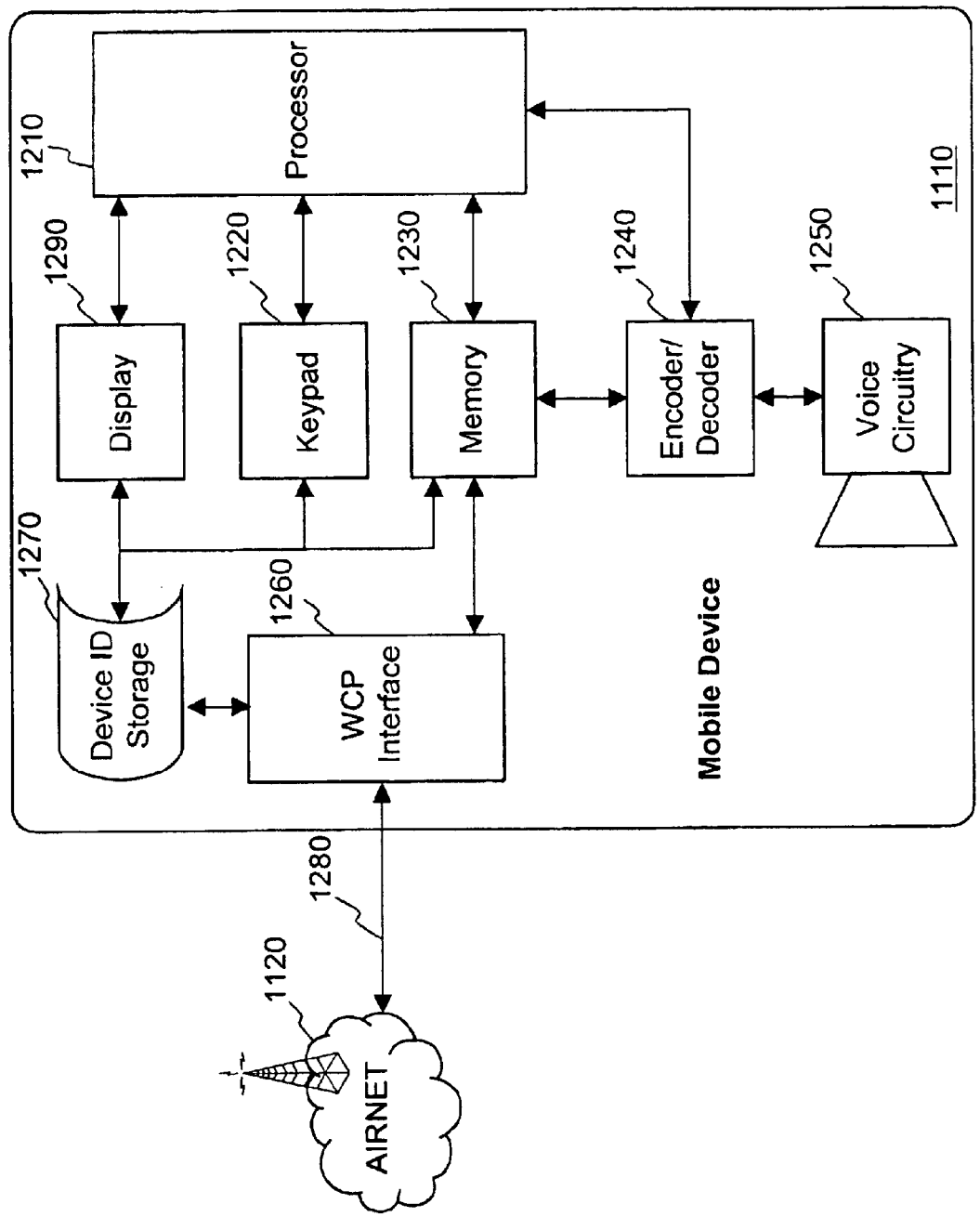
FIG. 12 illustrates an embodiment of a wireless device which may be connected to a network.

Turning to FIG. 12, a block diagram of one embodiment of a mobile device such as mobile device 1110 is illustrated. The mobile device 1110 includes a processor 1210 which may be or include any of: a general- or special-purpose programmable microprocessor, a Digital Signal Processor (DSP), an Application Specific Integrated Circuit (ASIC), a Field Programmable Gate Array, a Complex Programmable Logic Device, or any combination of these devices. Mobile device 1110 also includes a wireless control protocol (WCP) interface 1260 which couples to a carrier network via aimet 1120 to receive incoming and send outgoing signals. Device Identifier (ID) storage 1270 stores and supplies to WCP interface 1260 a device ID suitable for use in identifying the mobile device 1110 to outside entities.

Additionally, mobile device 1110 includes memory 1230, which stores data and/or software, keypad interface 1220 which couples the processor 1210 to the user interface 1117, and display 1290 which couples the processor 1210 to the display 1115. Mobile device 1110 may also include encoder/decoder 1240 and voice circuitry 1250 which may be utilized to transmit and receive voice signals to and from the user of the mobile device 1110. These voice signals may be either received from or transmitted to the aimet 1120 as appropriate.

It will be appreciated that a microbrowser may be part of the software stored in memory 1230, and that software suitable for implementing the method for supporting bi-directional text may also be stored in memory 1230. Similarly, logic or software (such as firmware for example) may be incorporated into the display interface 1290 to implement the method for supporting bi-directional text.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 6 or 9 may be integrated into components, or may be subdivided into components. Moreover, the blocks of FIG. 7 represent portions of a method which, in some embodiments, may be reordered or may be organized in parallel rather than in a linear or step-wise fashion. The present specification and figures are accordingly to be regarded as illustrative rather than restrictive.

What is claimed is:

1. A method implemented in a processing system comprising:

receiving a line of text, the line of text having a set of ordered characters having an original order and orientation;

flipping the characters of the line of text about a display axis;

identifying in the line of text a group of adjacent characters that share a characteristic not shared by at least one other character in the line of text; and flipping the characters of the group of adjacent characters about a vertical axis which passes through the group of adjacent characters so that the group of adjacent characters returns to the original order and orientation.

2. The method of claim 1 further comprising:

receiving a block of text;

breaking the block of text into a set of lines of text; and performing said receiving the line of text, flipping the characters of the line, identifying and flipping the group of adjacent characters, for each line of text of the set of lines of text.

3. The method of claim 2 further comprising:

displaying the line of text on a display device after said flipping the group of adjacent characters.

4. The method of claim 1 wherein:

the line of text is received from an application with no capability of handling bi-directional text.

5. The method of claim 1 wherein:

the group of adjacent characters are in a language which is normally read left-to-right.

6. The method of claim 1 wherein:

the group of adjacent characters are in a language which is normally read right-to-left.

7. A method as recited in claim 1, wherein the display axis is a center vertical axis of a display on which the line of text is to be displayed.

8. A method as recited in claim 1, wherein the characteristic is a left/right directionality of the characters of the group of adjacent characters.

9. A method as recited in claim 8, wherein said generating a set of runs comprises:

identifying any runs of foreign characters which span two lines in the block of text;

splitting each run of foreign characters which spans two lines in the block of text, if any, into two strings, one string on each of the two lines.

10. A method as recited in claim 8, wherein said flipping at least one run of characters about a vertical axis within the run of characters comprises flipping a run of characters, which has a different left-right characteristic than surrounding characters, about a vertical axis within the run of characters.

11. A machine-readable medium storing instructions, which, when executed by a processor, cause the processor to perform a process comprising:

receiving a line of text, the line of text having a set of ordered characters having an original order and orientation;

flipping the characters of the line of text about a center vertical axis of a display on which the line of text is to be displayed;

identifying a set of runs of foreign characters in the line of text; and for each identified run of foreign characters in the identified set, if any, flipping the run of foreign characters about a center vertical axis of the run of foreign characters so that the run of foreign characters returns to the original order and orientation.

12. The machine readable medium of claim 11 further storing instructions which when executed by the processor, cause the processor to perform a process comprising:

receiving a block of text;

breaking the block of text into a set of lines of text; and performing said receiving the line of text, flipping the characters of the line, identifying and flipping the run of foreign characters, for each line of text of the set of lines of text.

13. The machine readable medium of claim 11 further storing instructions which when executed by a processor, cause the processor to perform the method further comprising:

passing the line of text to a native operating system for display.

14. A method implemented in a processing system comprising:

receiving a line of text, the line of text having a set of ordered characters having an original order and orientation;

flipping the characters of the line of text about a center vertical axis of a display on which the text is to be displayed;

identifying zero or more runs of foreign characters in the line of text; and for each identified run of foreign characters in the line of text, if any, flipping the characters of the run of foreign characters about a center vertical axis of the run of foreign characters so that the run of foreign characters returns to the original order and orientation.

15. The method of claim 14 wherein the method further comprises:

receiving a block of text;

breaking the block of text into a set of lines of text; and performing said receiving the line of text, flipping the characters of the line, identifying and flipping the characters of the runs of foreign characters for each line of text of the set of lines of text.

16. The method of claim 15 wherein the method further comprises:

passing the line of text to a native operating system for display.

17. A processing system comprising:

a processor;

a display device; and a memory storing instructions which, when executed by the processor, cause the system to perform a process which includes receiving a line of text, the line of text having a set of ordered characters having an original order and orientation;

flipping the characters of the line of text about a vertical center axis of the display device;

identifying a run of foreign characters in the line of text; and flipping the characters of the run of foreign characters about a center vertical axis of the run of foreign characters so that the run of foreign characters returns to the original order and orientation.

18. The processing system of claim 17 wherein the process further comprises:

receiving a block of text;

breaking the block of text into a set of lines of text; and performing said receiving the line of text, flipping the characters of the line, identifying and flipping the characters of the run of foreign characters, for each line of text of the set of lines of text.

19. The processing system of claim 18 wherein the process further comprises:

passing the line of text to a native operating system for display.

20. The processing system of claim 19 wherein the processing system is a mobile device.

21. The processing system of claim 19 wherein the processing system is a mobile wireless device.

22. A method implemented in a processing system comprising:

receiving a line of text, the line of text having a set of ordered characters having an original order and original orientation;

generating a set of runs within the line of text;

flipping a location and an orientation of each run of the set of runs about a center vertical axis of a display; and identifying a set of runs of foreign characters within the line of text;

flipping the orientation of each run of foreign characters about a vertical axis within the run of foreign characters so that the run of foreign characters returns to the original order and original orientation.

23. The method of claim 22 further comprising:

rendering each run of the set of runs, except for the runs of foreign characters, in a first orientation; and rendering each run of foreign characters in a second orientation.

24. The method of claim 23 further comprising:

receiving a block of text having a set of ordered characters and a location; and breaking the block of text into a set of lines of text, each line having a set of ordered characters and a location.

25. The method of claim 24 wherein:

the text is received from an application with no capability of handling bi-directional text.

26. The method of claim 25 wherein:

the foreign characters are characters which are normally read left-to-right.

27. The method of claim 25 wherein:

the foreign characters are characters which are normally read right-to-left.

28. A method implemented in a processing system comprising:

receiving a block of text including a plurality of lines of text, each line including a plurality of ordered characters having an original order and orientation;

breaking the block into a plurality of lines of text;

for each of the lines of text into which the block of text has been broken;

determining a set of runs of characters within the line of text, including identifying left-right characteristics of each of the runs of characters;

flipping a location and an orientation of each run of characters about a center vertical axis of a display; and rendering each of the runs of characters on the display in accordance with the left-right characteristics of the run, including flipping at least one run of characters about a vertical axis within the run of characters so that the run of foreign characters returns to the original order and orientation.

* * * * *